3,440,211
FLAME RETARDANT NYLON COMPOSITION
Richard R. Lunt, Jr., Wilmington, Del., assignor to E. I.
 du Pont de Nemours and Company, Wilmington, Del.,
 a corporation of Delaware
No Drawing. Continuation of application Ser. No.
 568,150, July 27, 1966. This application Apr. 5,
 1968, Ser. No. 719,270
Int. Cl. C08g 41/02; C09k 3/28
U.S. Cl. 260—45.7    5 Claims

ABSTRACT OF THE DISCLOSURE

Chlorinated biphenyl containing from 20 to 71 percent by weight of chlorine is added to the polyamide of 1,12-dodecanedioic acid and bis(para-aminocyclohexyl)methane for flame retardant purposes.

---

This is a continuation of application S.N. 568,150, filed July 27, 1966, now abandoned.

This invention relates to a novel nylon composition which is particularly suitable for use in electrical applications.

Polyamides, commonly known as nylons, suffer somewhat the disadvantages of being moisture sensitive and flammable. Previous attempts at decreasing the flammability of polyamides have generally been unsuccessful because of the tendency of the polyamide to degrade in the presence of fire retardant agents. These deficiencies hamper the usability of polyamides in electrical applications such as motor housings or insulation for wire.

The present invention provides a polyamide composition which overcomes these deficencies. This composition comprises the polyamide of 1,12-dodecanedioic acid and bis(para-aminocyclohexyl)methane and a flame retardant amount of biphenyl which is chlorinated to contain from 20–71% by weight of chlorine. The polyamide component of the composition may also be defined as consisting of carbonamide repeating units as an integral part of the polymer chain, the units having the following structural formula:

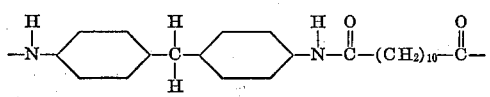

The composition of the present invention is substantially insensitive to moisture and is self-extinguishing over a wide range of humidity. The chlorinated biphenyl additive to the polyamide component of the composition does not adversely affect the physical properties of the polyamide as is the case when other chlorinated aromatic compounds are substituted for the chlorinated biphenyl in the compositions of the present invention. For example, chlorinated benzene and chlorinated triphenyls give poor results when incorporated into the polyamide component. Chlorinated biphenyl, falling right between these compounds, would be expected to give similar results but instead and surprisingly so, yields a composition which exhibits both good physical properties and resistance to burning.

The polyamide component of the compositions of this invention are normally solid and can be made by procedures which are conventionally employed for making polyamides, with the dicarboxylic acid employed being dodecanedioic acid and with the diamine reactant employed being bis(para-aminocyclohexyl)methane or an amide-forming derivative thereof. The diamine is generally a mixture of isomers having the trans-trans, cis-trans, and cis-cis configurations which appear in the polyamide. The diamine reactant employed in the present invention and appearing as a derivative unit in the polycarbonamide chain, preferably contains from 5–99% of the trans-trans isomer. By way of example, the polyamide can be prepared by adding to an autoclave containing 100 parts by weight of water and 50 parts by weight of bis(para-aminocyclohexyl)methane containing 70% by weight of trans-trans isomer and 50 parts by weight of dodecanedioic acid. Also added to the autoclave is 0.005% manganous hypophosphite. This solution is heated under 350 p.s.i. for 2 hrs. while the temperature is raised to 285° C. The pressure is then reduced to atmospheric while the temperature is raised to 315° C. and the resultant polyamide held under these conditions for 1 hr. The polyamide is then dewatered, extruded at 315° C., and cut into flakes.

The chlorinated biphenyl component of the compositions of this invention preferably contains from 50–71% by weight chlorine. A fire retardant effect is obtained when from 1–20% by weight based on the total weight of the composition is the chlorinated biphenyl compound. However, from 2–12% by weight of chlorinated biphenyl, based on the weight of the composition, is generally adequate.

The chlorinated biphenyl is added to the polyamide component in any manner which produces an intimate mixture of the two components, such as by dry blending and then melt extruding into molding powder or molding or extruding the dry blend to the desired shape, or by adding the chlorinated biphenyl to the polyamide while the polyamide is in the extruder. The resultant composition can be fabricated to useful articles for commerce such as motor housing or jacketting for electrical wire by conventional melt fabrication procedures usually done at temperatures of 260° C. to 350° C. The polyamide component of the composition generally has an inherent viscosity of at least 0.6 (measured at 25° C. in a solution containing 0.5 gm. of polyamide in 100 gm. of m-cresol); for convenience, the polyamide can be called normally solid.

The following is intended as examples of the present invention and not as any limitation thereof. Parts and percents are by weight unless otherwise indicated.

EXAMPLE 1

Polyamide having an inherent viscosity of 1.28 measured as stated above in m-cresol, made by co-condensing equal parts of dodecanedioic acid and bis(para-aminocyclohexyl)methane consisting of 55% trans-trans isomer and containing 0.005% of manganous hypophosphite is finely ground on an Abbey cutter, using liquid nitrogen to facilitate grinding. The ground polymer is dried overnight at 100° C. under a vacuum of about 50 mm. of Hg controlled with a flow of $N_2$ through the oven. Then, 270 gm. of the ground polymer is dry tumbled with 30 gm. of chlorinated diphenyl (68% by weight chlorine). The resultant composition is molded into ½" x ⅛" x 5" test bars in a 1-oz. molding press equipped with a rotating spreader to achieve maximum dispersion. The bars are immediately bottled to keep them in the dry-as-molded condition. The molding temperature is about 290° C. The mold temperature is about 55° C. The moldability of the composition is excellent as is the appearance of the test bars. The test bars are 100% self-extinguishing when subjected to the flammability test of ASTM D 635–56T, have a notched Izod value of 1.64 ft.-lbs. as measured at 23° C. according to ASTM D 256–65T and a flexural modulus at 23° C. of 243,000 p.s.i. as measured according to ASTM D 790–59T. Twenty of the test bars withstand one bend of 180° at 23° C. and about a ⅛" mandrel.

Bars of the same polyamide but without chlorinated biphenyl are made and subjected to these tests with the following results: 40% self-extinguishing, mandrel bend—no breakage, notched Izod of 1.93 ft.-lbs., and a flexural modulus of 225,000 p.s.i.

A comparison of these results show that the physical properties of the polyamide are affected only in a small degree by the chlorinated biphenyl addition, and yet the flammability of the composition is decreased from 60% burning to 0% burning.

EXAMPLE 2

The procedures of Example 1 are followed in the preparation and testing of test bars, with the exception that the composition contains only half as much of the same chlorinated biphenyl. The composition exhibits excellent moldability and appearance, is 100% self-extinguishing, mandrel bends—no breakage, has a notched Izod of 1.89 ft.-lbs., and a flexural modulus of 232,000 p.s.i.

EXAMPLE 3

The procedures of Example 1 are followed in the preparation and testing of test bars, except that the composition contains only ¼ as much of the same chlorinated biphenyl. The composition exhibits excellent moldability and apperance, is 80% self-extinguishing, mandrel bend—no breakage, and has a flexural modulus of 246,000 p.s.i.

EXAMPLE 4

Polyamide of Example 1 is spun at a rate of 100 y.p.m. into 10 filaments at a block temperature of 260° C. and spinneret temperature of 266° C. The filaments are drawn 2.7× over a hot pin at 140° C. immediately after spinning, to give a yarn with a tenacity of 2.7 g.p.d. and elongation of 30%. A portion of this yarn is additionally drawn in a separate operation at 27 y.p.m. and 130° C. to a draw ratio of 3.9×. The resultant yarn has a tenacity of 4.2 g.p.d. at an elongation of 12% for the additionally drawn portion. The work recovery of this portion at 3% stretch is 68% and at 5% stretch, 71%. Then tensile form recovery at 3% stretch is 87%; at 5% stretch, 89%. The resultant yarn is wound into a skein 7½ in. in length, weighing 2 gms. Yarn finish is removed by immersion in acetone for 30 sec. and the skein is dried overnight. The skein is suspended vertically and a lighted match is held thereunder for 5 and 10 sec.; no ignition occurs. Polyamide of Example 1 without chlorinated diphenyl is made into skeins and treated in the same way as previously described in this paragraph. This skein is vertically suspended and exposed for 5 sec. to a lit match. The skein ignites and continues to burn until the entire skein is consumed.

As many apparently widely different embodiments of this invention may be made without departing from the spirit and scope thereof, it is to be understood that this invention is not limited to the specific embodiments thereof except as defined in the appended claims.

What is claimed is:

1. A composition of a polyamide of 1,12-dodecanedioic acid and bis(para-aminocyclohexyl)methane and a flame retardant amount of chlorinated biphenyl containing from 20 to 71% by weight of chlorine based on the weight of said chlorinated biphenyl.

2. The composition of claim 1 wherein said flame retardant amount is from 1 to 20% by weight based on the weight of said composition.

3. The composition of claim 1 wherein said flame retardant amount is from 2 to 12% by weight based on the weight of said composition.

4. The composition of claim 1 wherein from 50 to 71% by weight based on the weight of said chlorinated biphenyl is chlorine.

5. The composition of claim 1 in the form of a fiber.

References Cited

UNITED STATES PATENTS 3,294,710   12/1966   Rosenberg et al. ____ 260—45.7

DONALD E. CZAJA, *Primary Examiner.*

M. J. WELSH, *Assistant Examiner.*